United States Patent [19]
Uranaka et al.

[11] Patent Number: 5,765,678
[45] Date of Patent: Jun. 16, 1998

[54] CONVEYOR BELT

[75] Inventors: Masaki Uranaka; Shinichi Sumino, both of Kanagawa, Japan

[73] Assignee: Bridgestone Corporation, Tokyo, Japan

[21] Appl. No.: 575,084

[22] Filed: Dec. 19, 1995

[30]  Foreign Application Priority Data

Dec. 20, 1994 [JP] Japan ................................ 6-316409

[51] Int. Cl.⁶ ................................................ B65G 43/02
[52] U.S. Cl. ............................. 198/810.01; 198/502.1; 198/819
[58] Field of Search ........................... 198/502.1, 818, 198/819, 824, 825, 810.01

[56]  References Cited

U.S. PATENT DOCUMENTS 3,597,756  8/1971  Jackson .............................. 198/502.1

FOREIGN PATENT DOCUMENTS

| | | | |
|---|---|---|---|
| 4018866 | 12/1991 | Germany | 198/819 |
| 151508 | 9/1982 | Japan | 198/819 |
| A 60-36215 | 2/1985 | Japan . | |
| 221008 | 10/1986 | Japan | 198/819 |
| A 61-221007 | 10/1986 | Japan . | |
| A 5281015 | 10/1993 | Japan . | |

*Primary Examiner*—Karen M. Young
*Assistant Examiner*—Gregory A. Morse
*Attorney, Agent, or Firm*—Sughrue, Mion, Zinn, Macpeak & Seas, PLLC

[57]  ABSTRACT

By employing a simple structure, the invention provides a conveyor belt which can detect overload and can be easily applied to an existing conveyor belt. Further, detection of twisting and slippage of the conveyor belt can be obtained. Specifically, an overload can be detected by measuring a load of an orthogonal direction with respect to a rotation axis of shape-maintaining rollers by a load cell installed on a bracket. Further, twisting of the conveyor belt can be also detected by measuring a load of an axial direction with respect to the rotation axis of the shape-maintaining rollers.

4 Claims, 5 Drawing Sheets

F I G. 5
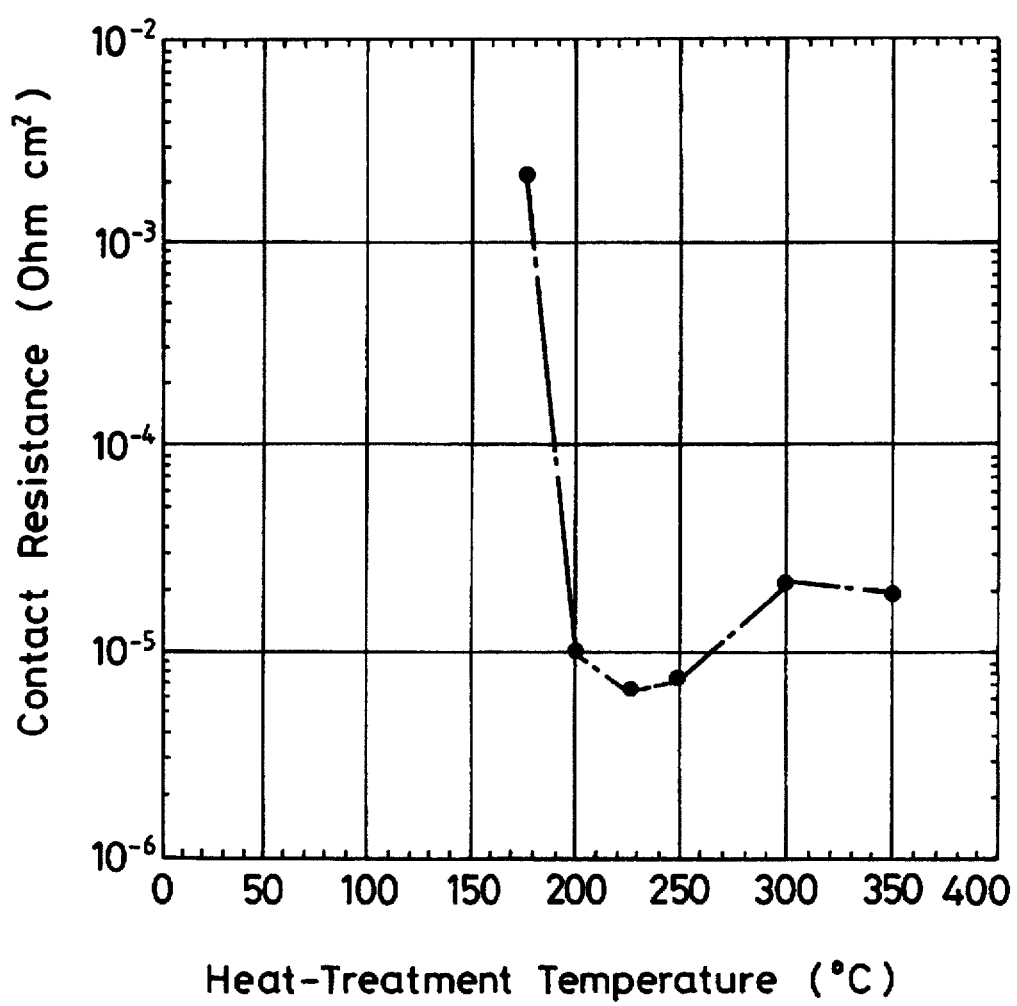

CONVEYOR BELT

BACKGROUND OF THE INVENTION

1. Field of the Invention

This invention relates to a conveyor belt having rollers which support the belt, and more particularly to a tubular belt conveyor having a tubular shape at either or both of its forward and returning paths.

2. Description of the Prior Art

A conventional tubular belt conveyor will be described with reference to FIGS. 4 to 7 of the accompanying drawings.

In the conventional tubular conveyor belt, an endless conveyor belt 1 is rolled out to a flat shape which is wound around a pair of pulleys 2 and 3, and is circulated by rotating any of the pulleys 2 and 3 by drive means such as a motor (not shown). Reference numeral 4 denotes a support frame extending along the length of the conveyor.

Forward and returning paths 1a and 1b of the conveyor belt 1 pass through openings 5c in the middle of upper and lower chambers 5a and 5b of a plurality of shape-maintaining frames 5 at a certain distance along a conveying direction between the pulleys 2 and 3, and the belt 1 is rolled up to a tubular form by a plurality of shape-maintaining rollers 6 arranged concentrically around the opening 5c. The shape-maintaining rollers 6 are supported by brackets 7 fixed to the shape-maintaining frame 5.

As shown in FIG. 4, in trough transforming sections A, A', B and B' in which the conveyor belt 1 is rolled up into a tubular shape from a flat shape wound on one of the pulleys 2 and 3, or is rolled out from a tubular shape into a flat shape wound on the other of the pulleys 2 and 3, the conveyor belt 1 is guided by guide rollers 9 pivoted to a plurality of guide frames 8a fixed to frames 8 which extend from the ends of the support frame 4.

As shown in FIG. 6, while the conveyor belt 1, which is rolled out to a flat shape and rotates around the rear pulley 3, is rolled up through the guide frames 8a of the trough transforming section A, and encloses material 11 charged from a supply hopper 10.

Then, the belt 1 passes through the upper opening 5c of each of the shape-maintaining frames 5 and is rolled out to a flat shape while it passes through the guide frames 8a in the trough transforming section B. When the belt 1 is rotated around the front pulley 2, the material 11 is discharged into a receiving hopper 12. The belt 1 is then rolled up into a tubular shape again in the trough transforming section A' and passes through the lower opening 5c of each of the shape-maintaining frames 5. The belt is ultimately rolled out to a flat shape in the trough transforming section B' and passed around the rear pulley 3.

The foregoing describes the structure and operation of such a tubular conveyor belt. In the tubular conveyor belt of this kind, if too much material 11 is charged from the supply hopper 10 or the material 11 itself is too bulky, the conveyor belt 1 becomes overloaded, resulting in damage to the conveyor belt 1 and the shape-maintaining rollers 6, and conveying has to be stopped.

In order to prevent such a situation, it is known to constantly measure the tension applied to the pulley 2 or 3 from the conveyor belt 1, and if the tension becomes too high, the conveyor belt 1 stops conveying.

In a conventional tension detecting means, for measuring the tension applied to the pulley 2 or 3 from the conveyor belt 1, the devices used for this purpose are expensive and take up a lot of space. Further, the locations in which the devices can be installed are limited, and the devices must be installed at the assembling stage of the conveyor belt.

In the conventional method, the locations of the conveyor belt 1 in which problems occur cannot be easily detected. Further, twisting of the conveyor belt 1 resulting in dropping of the material cannot be detected.

For detecting the twisting of the conveyor belt 1, a photoelectric sensor and an ultrasonic sensor can be used. These devices are also expensive and take up a lot of space. Even by employing these devices, an overload cannot be detected.

It is an object of the present invention, by employing a simple structure, to provide a conveyor belt which can detect an overload, and which can be easily installed in an existing conveyor belt. Further, in the present invention, twisting of the conveyor belt can also be detected.

SUMMARY OF THE INVENTION

The present invention, in a first aspect, provides a conveyor belt comprising a belt which is conveyed while supported by a plurality of rollers each installed on a bracket fixed to a frame. A load cell which can detect a load in an orthogonal direction with respect to a rotation axis of the rollers is installed on a bracket.

The invention in a second aspect provides a conveyor belt comprising a belt which is conveyed while supported by a plurality of rollers each installed on a bracket fixed to a frame. A load cell which can detect a load in an orthogonal direction with respect to a rotation axis of the rollers and a load in the same direction as the rotation axis is installed on a bracket.

In a preferred embodiment of both aspects of the invention, a belt being wound around a pair of pulleys is formed into a tubular shape at a middle portion of either or both of forward and returning paths and the tubular shape portion of the belt is supported by being retained by a plurality of rollers arranged concentrically, wherein a load cell is installed on at least one of brackets holding the rollers.

An overload can be detected by measuring a load of an orthogonal direction with respect to a rotation axis of rollers by a load cell installed on a bracket, according to the first aspect of the invention. Further, twisting of the conveyor belt can also be detected by measuring a load of an axial direction the same as the rotation axis of the rollers, according to the second aspect of the invention.

DESCRIPTION OF THE PREFERRED EMBODIMENTS

Figure 1:
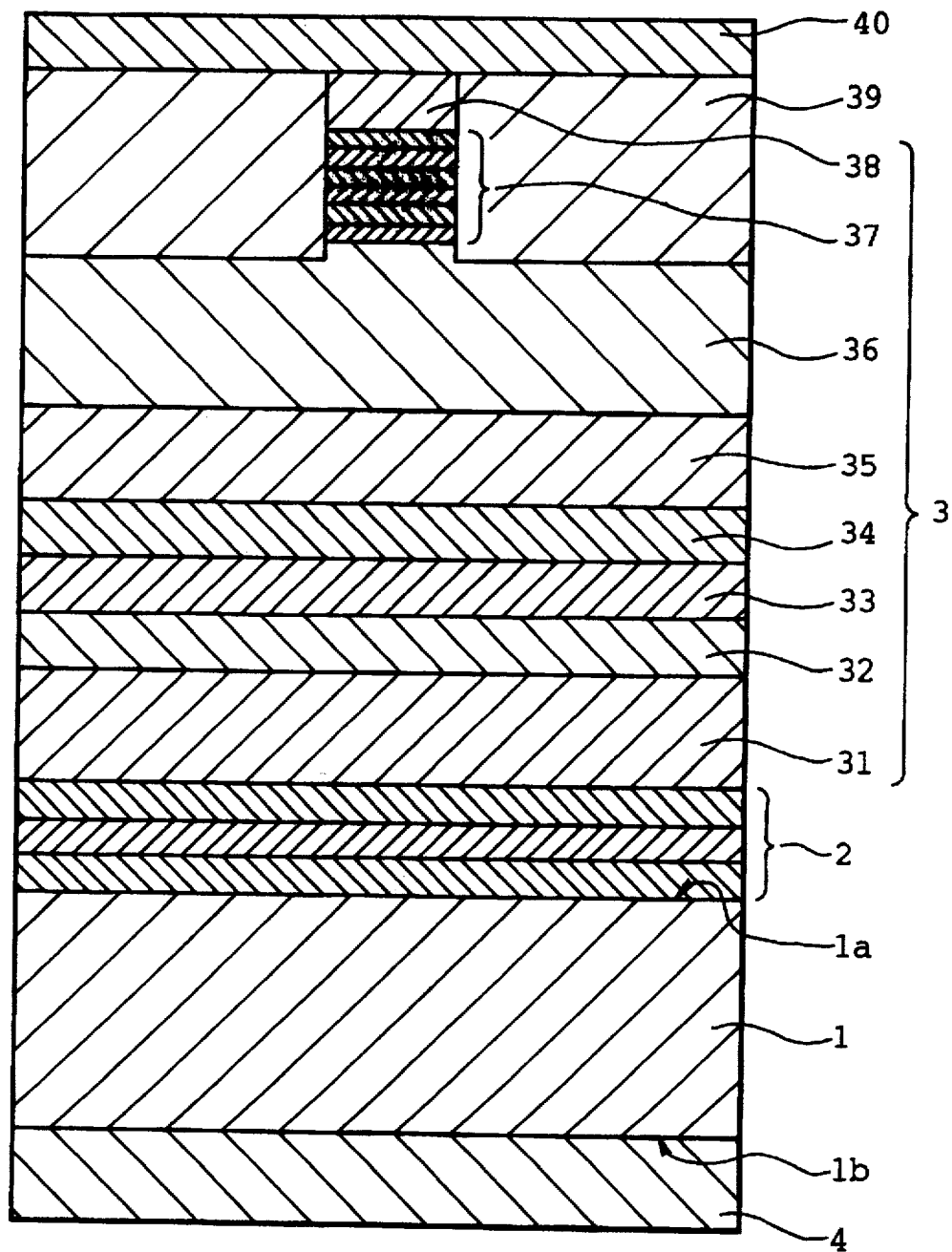
FIG. 1 is a front view of a vertical section of a principal part of a first embodiment of the present invention.

A first embodiment of the present invention will be explained with reference to FIGS. 1 and 2. In this embodiment, since the basic structure of the conveyor belt of the present invention is the same as that of the prior art, the same reference numerals as in the prior art will be used, and detailed explanation thereof will be omitted. The same applies to the second embodiment as shown in FIG. 3.

Figure 2:
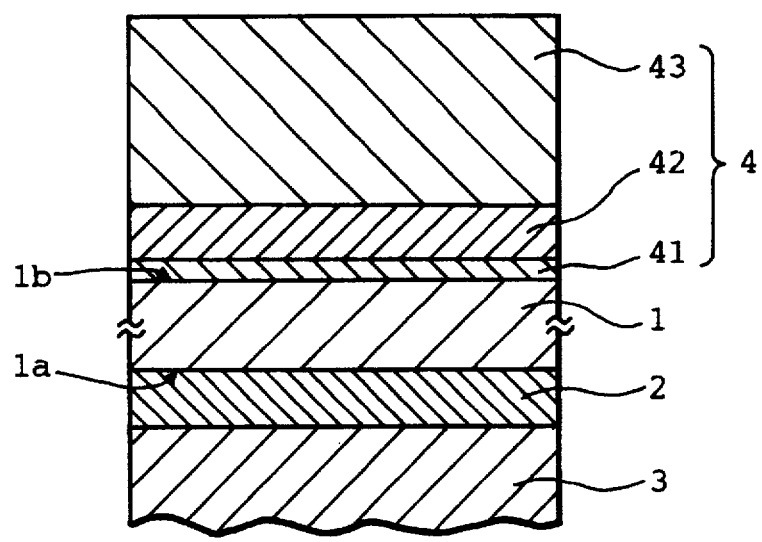
FIG. 2 is a side view of a vertical section along the line II—II of FIG. 1.
Figure 3:
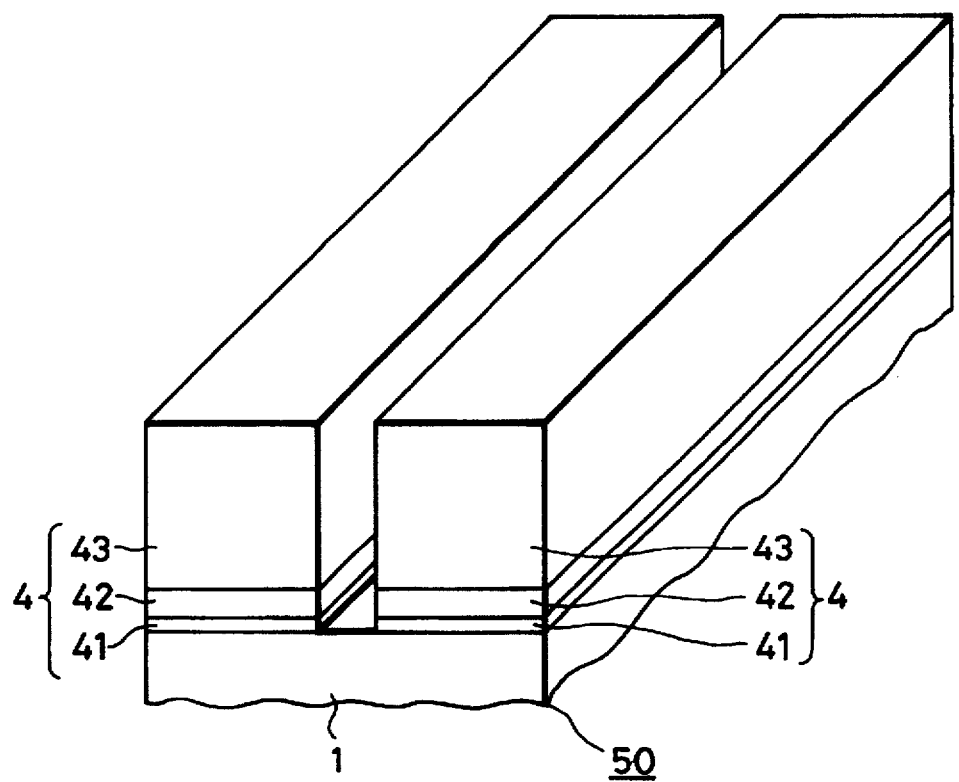
FIG. 3 is a perspective view of a principal part of a second embodiment of the present invention.
Figure 4:
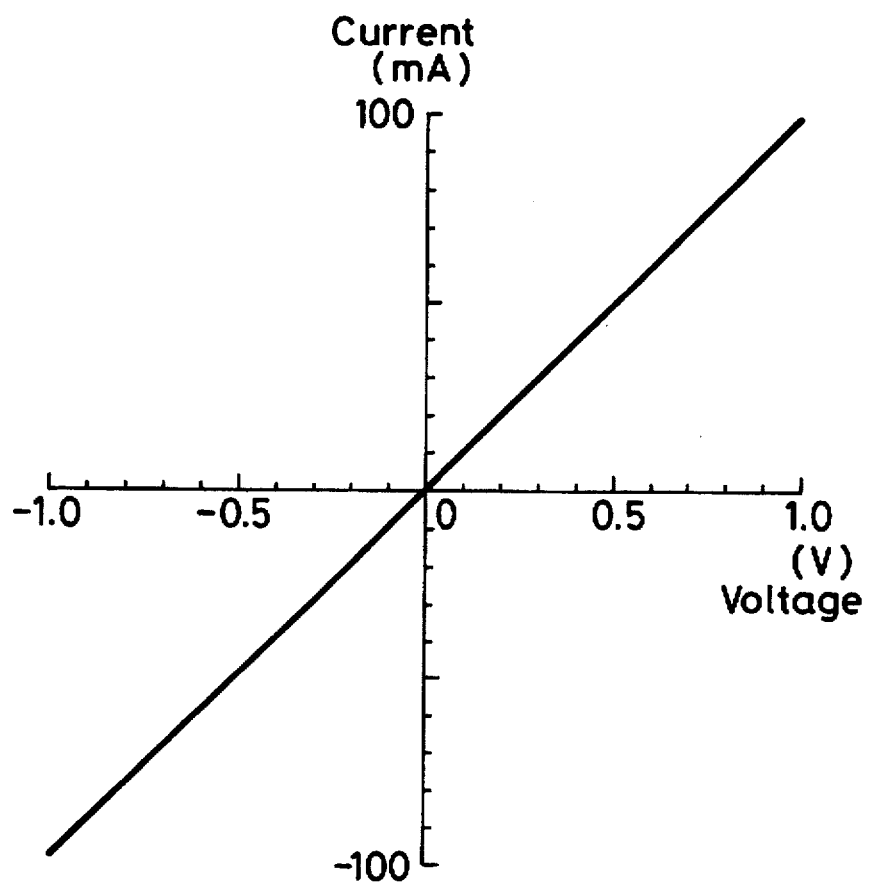
FIG. 4 is a side view of a conventional tubular shape conveyor.
Figure 6:
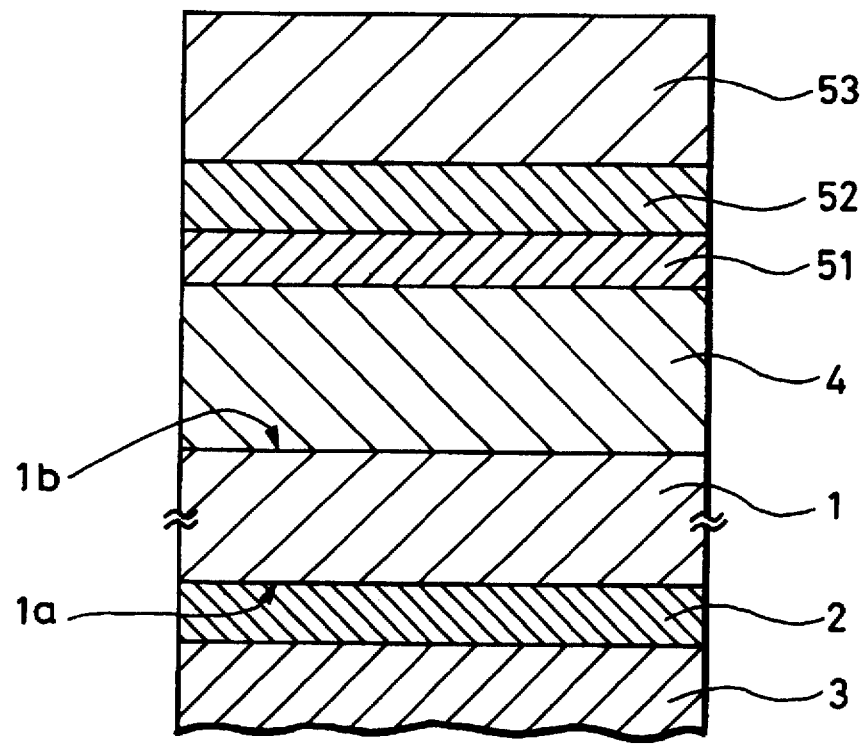
FIG. 6 is a plan view of a rear part of the conventional tubular shape conveyor.
Figure 1:
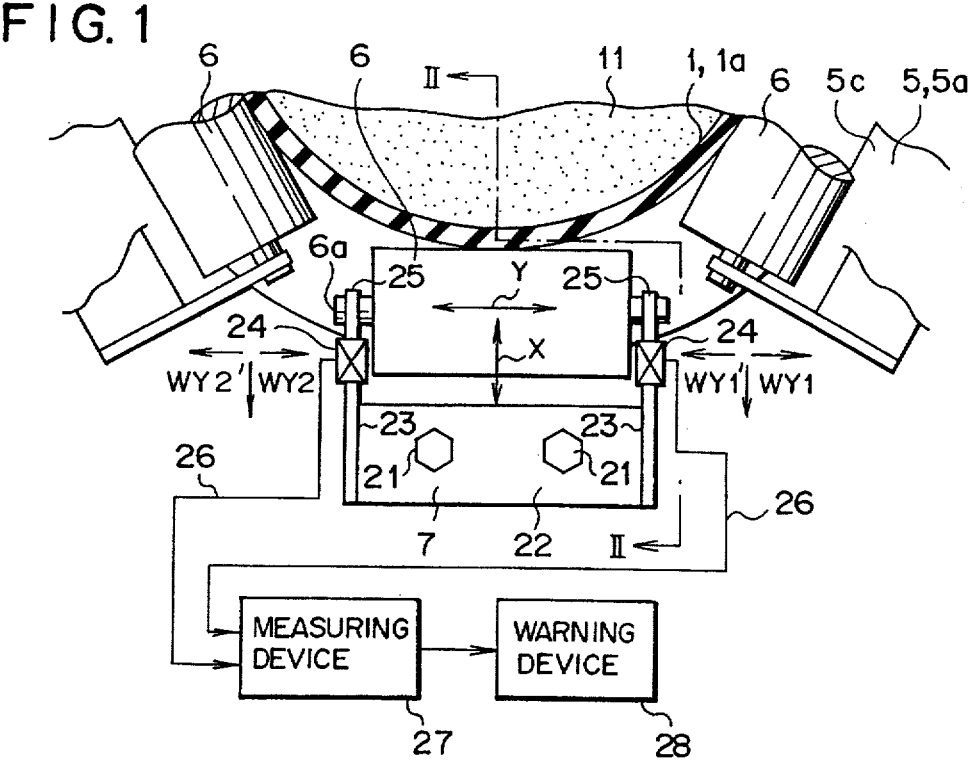
Figure 2:
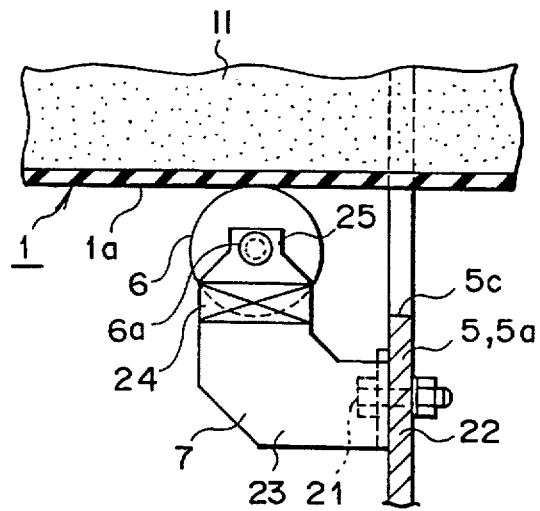
Figure 3:
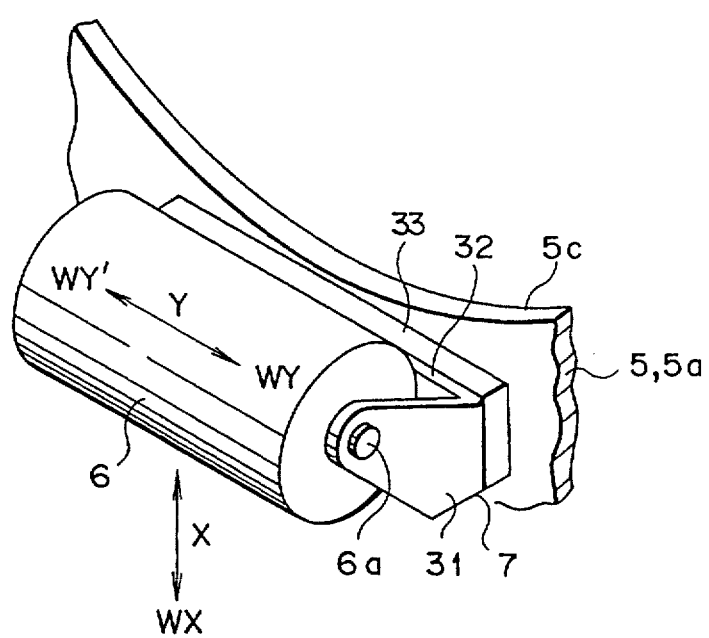
Figure 4:
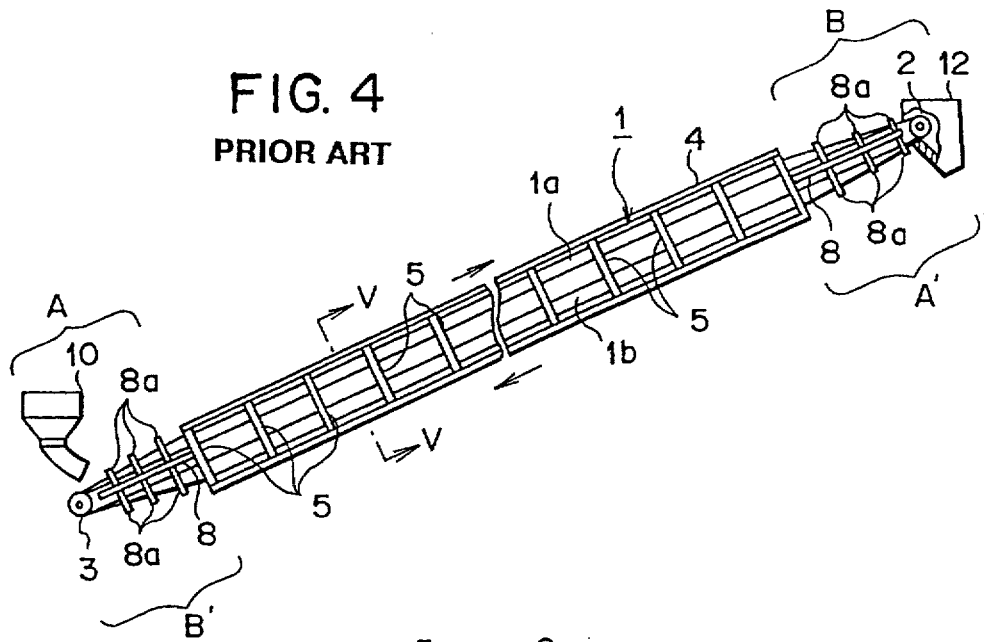
Figure 5:
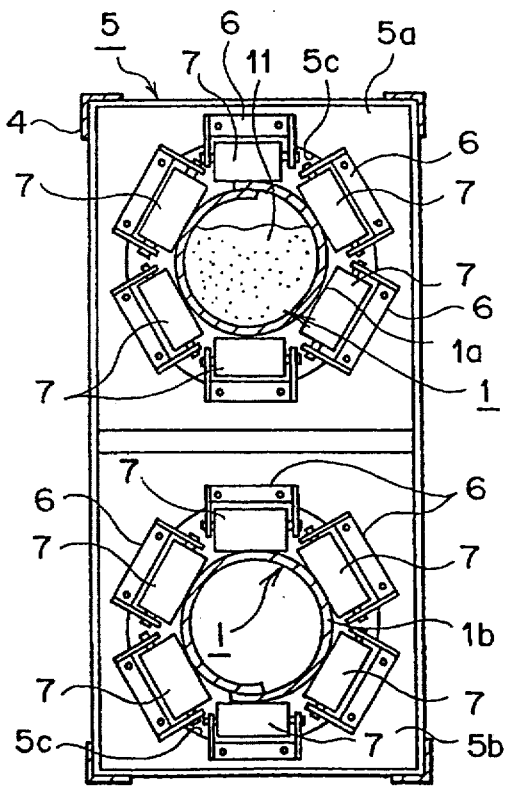
FIG. 5 is an enlarged section view along the line V—V of FIG. 4.
Figure 6:
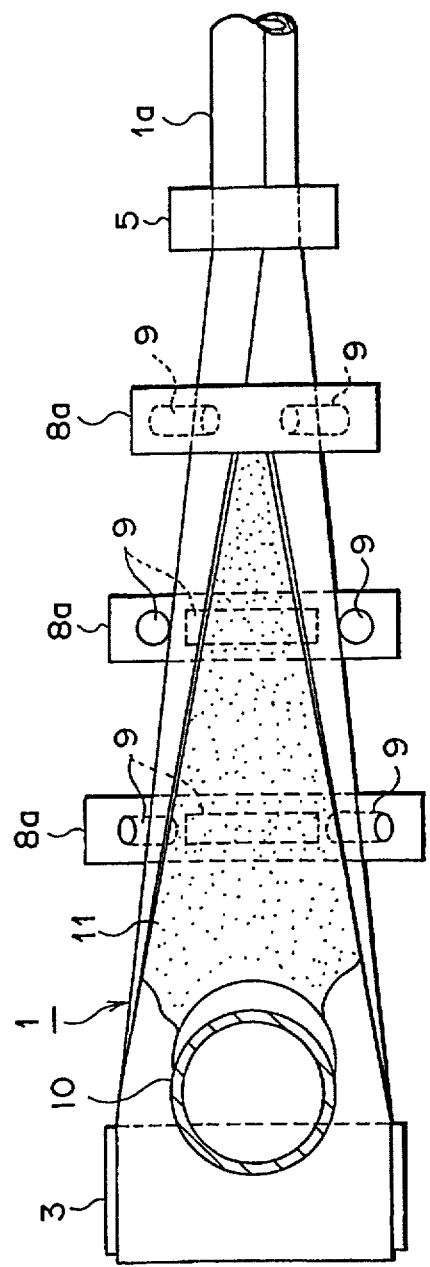
Figure 7:
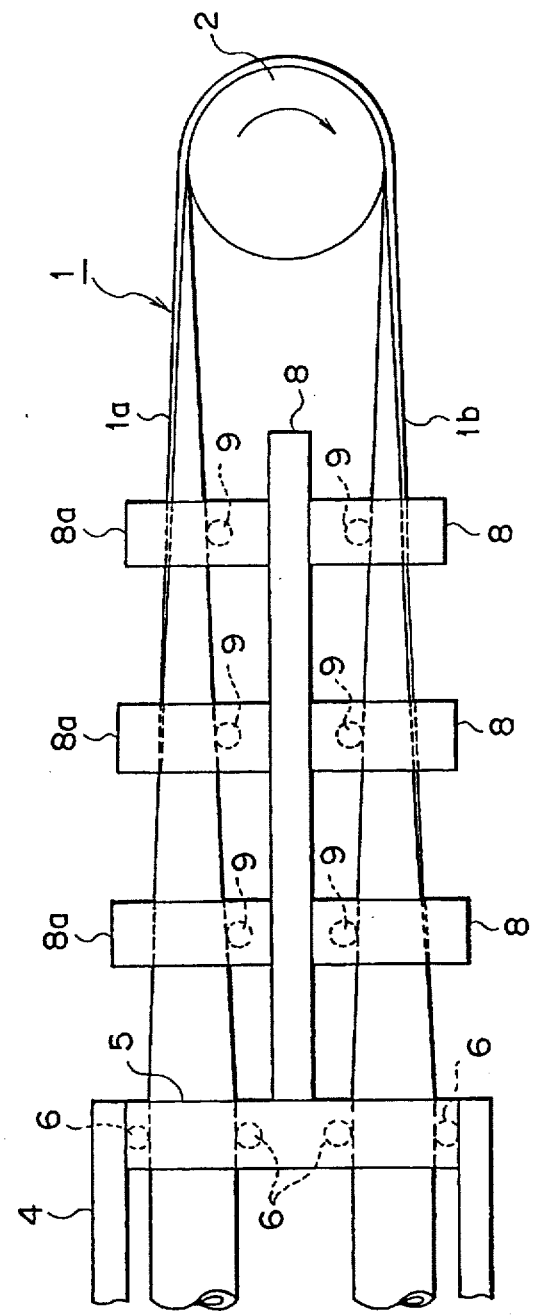
FIG. 7 is a plan view of a front part of the conventional tubular shape conveyor.

In the embodiment of FIGS. 1 and 2, there is shown a lower mid bracket 7 among six brackets 7 fixed to an upper chamber 5a of a shape-maintaining frame 5 of the conveyor belt 1 of a forward path 1a.

This bracket 7 comprises a base plate 22 fixed by bolts 21, side plates 23 extending from the base plate 22 in a forward and upper direction, and bearings 25 supporting a rotation axis 6a of the shape-maintaining roller 6 through load cells 24.

Each load cell 24 having a strain meter therein is positioned orthogonal with respect to the rotation axis 6a of the shape-maintaining roller, and is also orthogonal with respect to an axial center of the tubular shape conveyor belt. The load cell, which is well known, can detect a load of an X direction orthogonal with respect to the axial center and a load of a Y direction which is the same direction as the rotation axis 6a.

Each load cell 24 is connected to a measuring device 27 by signal wires 26. In the measuring device 27, the value of the loads of the X direction (WX1)(WX2) detected by each load cell 24 are added, and if the amount of the load ΣWX exceeds a predetermined load (WXO), driving devices of the pulleys 2, 3 stop and, at the same time, a warning device 28 such as a warning buzzer or warning lamp is activated.

Further, in the measuring device 27, an amount (ΣWY) of a value of loads (WX1)(WX2) and an amount (ΣWY') of a value of loads (WX1')(WX2') detected by each load cell 24 are subtracted. A difference (ΣWY–ΣWY') provides a direction and degree of the twisting of the conveyor belt 1. If the conveyor belt twists, slip occurs in the Y direction between the conveyor belt and the shape-maintaining roller 6 resulting in thrust applied to the bearing 25. By detecting the value of the thrust force, the twisting direction and degree can be detected.

When the reference (ΣWY–ΣWY') is positive, the conveyor belt 1 twists clockwise, and when the difference is negative, the conveyor belt 1 twists counterclockwise. Further, the degree of the twisting can be measured by an absolute value (|ΣWY–ΣWY'|).

Information about twisting of the conveyor belt 1 is sent to twist adjusting devices, which are commercially used, and the twisting should be adjusted.

If the degree of the twisting exceeds a predetermined value, the driving device of the pulleys 2, 3 should be stopped.

According to this embodiment, by employing a simple structure such as installing load cells on the bracket, an overload and at the same time twisting of the conveyor belt 1 can be detected accurately and quickly.

In the case that twisting of the conveyor belt 1 does not need to be detected, the load cell 24 is used for detecting load only in the X direction.

A second embodiment will be explained with reference to FIG. 3. In this embodiment, one load cell 33 is installed at a rear side of a panel 32 of a bracket 7 having side panels 31 supporting a rotation axis 6a of the shape-maintaining roller 6, and the rear side of the load cell is fixed to the shape-maintaining frame 5.

The load cell 33, which is well known, can detect a load (WX) of an X direction orthogonal with respect to the rotation axis 6a of the shape-maintaining roller 6 and a load (WY)(WY') of a Y direction which is the same direction as the rotation axis 6a.

In this embodiment, even if there is a single load cell 33, the load (WX) in the X direction and the load (WY) (WY') in the Y direction applied to the shape-maintaining roller 6 can be detected. In this construction, since calculation such as subtraction and addition of the two load cells is not necessary, the conveyor belt can be more easily controlled.

According to the load (WX) in the X direction and the load (WY)(WY') in the Y direction, the same countermeasures mentioned in the first embodiment such as stopping of driving of the pulleys 2, 3, warning method and twist adjusting method can be adopted.

In both embodiments, this invention is adapted to a tubular shape conveyor, but it can also be adapted to a flat shape conveyor. In this case, the conveyor belt is supported by three rollers in U-shape, and the load cells 24 in the first embodiment or the load cell 33 in the second embodiment can be installed on a bracket holding the mid and horizontal roller.

In the first embodiment, among six shape-maintaining rollers 6, the load cell can be installed on the bracket of a single shape-maintaining roller, a pair of up and down shape-maintaining rollers, a pair of right and left shape-maintaining rollers, or all of the shape-maintaining rollers.

According to the present invention, the following effects can be obtained.

(a) By employing a simple construction such as installation of the load cell to the bracket of the roller, an overload of the conveyor belt can be detected, and problems of loading at a location corresponding to the location in which the load cell is installed can be easily and accurately detected. Accordingly, a countermeasure can be taken quickly.

(b) Even in an existing conveyor belt, by replacing at least one bracket supporting a roller by the construction of the present invention, the present invention can be easily achieved. Further, if necessary, the location of the bracket having the load cell therein can be easily changed.

(c) According to the second aspect of the invention, in addition to the overload, twisting and slippage of the conveyor belt can be easily detected.

According to the preferred embodiment of the invention, even in a tubular shape conveyor, considerable effects can be obtained.

While the invention has been particularly shown and described with reference to certain preferred embodiments thereof, it will be understood by those skilled in the art that various changes and modifications may be made without departing from the spirit and scope of the invention.

We claim:

1. A conveyor belt comprising; a belt which is conveyed while supported by a plurality of rollers each installed on a bracket fixed to a frame, and a load cell to detect a load in an orthogonal direction with respect to a rotation axis of one of the rollers and a load in the same direction as the rotation axis, said load cell installed on one of said brackets.

2. The conveyor belt according to claim 1, wherein a belt wound around a pair of pulleys is formed into a tubular shape at a middle portion of at least one path of forward and returning paths and the tubular shape portion of the belt is supported by a plurality of rollers arranged concentrically, and wherein a load cell is installed on at least one of brackets holding the rollers.

3. The conveyor belt according to claim 1, wherein the bracket comprises a base plate, side plates extending from the base plate in a forward and upper direction, and bearings supporting the rotation axis of the roller through said load cell.

4. The conveyor belt according to claim 1, wherein a load cell is installed at a rear side of a panel of a bracket having side panels supporting the rotation axis of the roller, and wherein the rear side of the load cell is fixed on the frame.

* * * * *

UNITED STATES PATENT AND TRADEMARK OFFICE
CERTIFICATE OF CORRECTION

PATENT NO. : 5,765,678
DATED : June 16, 1998
INVENTOR(S) : Maaki URANAKA and Shinichi SUMINO It is certified that error appears in the above-identified patent and that said Letters Patent is hereby corrected as shown below:

Delete Drawing Sheets 1-4, and substitute therefor the Drawing Sheets, consisting of FIgs. 1-7 as shown on the attached drawings.

Signed and Sealed this

Fourth Day of May, 1999

*Attest:*

Q. TODD DICKINSON

*Attesting Officer*     Acting Commissioner of Patents and Trademarks